June 26, 1928.

A. A. H. MILLET 1,675,039

MOTOR VALVE

Filed Nov. 24, 1925

INVENTOR.
A. A. H. Millet
BY Marks & Clerk
ATTORNEY.

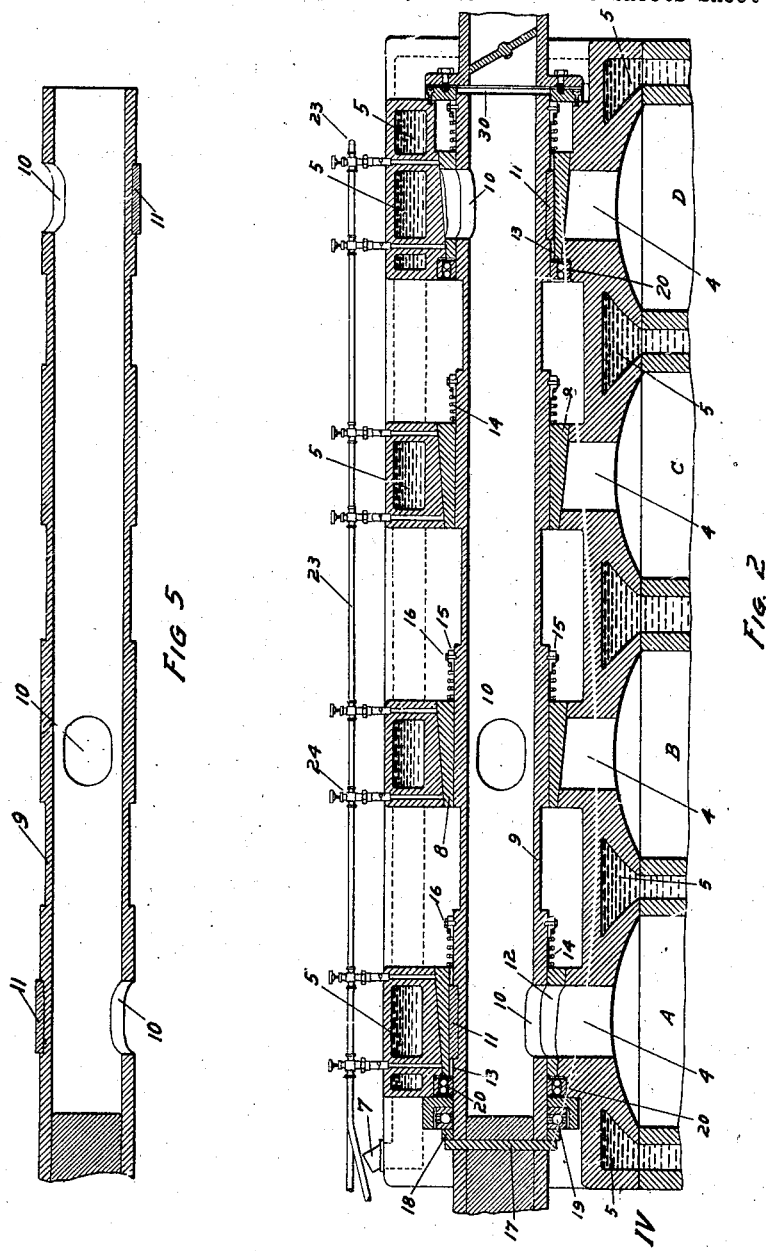

June 26, 1928.

A. A. H. MILLET 1,675,039

MOTOR VALVE

Filed Nov. 24, 1925

INVENTOR.
A.A.H. Millet
BY Marks & Clerk
ATTORNEY.

Patented June 26, 1928.

1,675,039

UNITED STATES PATENT OFFICE.

ARMANDO ADOLFO HERNANDEZ MILLET, OF HABANA, CUBA.

MOTOR VALVE.

Application filed November 24, 1925, Serial No. 71,210, and in Cuba November 17, 1925.

This invention relates to an improvement in rotary valves for internal combustion engines, particularly for engines having a plurality of cylinders and separable block cover for the cylinders, and is designed to provide a cheap and efficient construction as well as an economical maintenance and operation.

This invention provides for the placing of the rotating valves upon two rotating hollow shafts, which serve as intake and exhaust manifolds respectively, and which are mounted upon axial and radial ball-bearings in such way as will not prevent the free expansion of these rotating manifolds due to changes in temperature.

Another object of this invention is to provide a mechanism that prevents the valves from binding or from improperly fitting on their seats when expansions take place due to temperature changes.

A further object of this invention is to provide means for lubricating under pressure all the wearing surfaces of the valves and valve seats in such manner that the main source of lubricant supply will never be in either direct communication with the manifold or with the interior of the cylinders.

Another object of this invention is to provide a mechanical combination that will permit the gases to flow always continuously in one direction only without reversal of motion either on the admission to or the exhaust from the cylinders.

A further object of this invention is to provide means for the cooling of the largest possible surface of the valve seats and the cylinder block cover jointly.

A further object of this invention is to provide for the adjustment of each valve separately and independently of the others; and also to provide for the replacement of any valve without the necessity of replacing the whole series of valves or the hollow shaft which serves as manifold and which actuates the rotary movement of the valves.

The accompanying drawings show the peculiar features of this present invention both as to construction and arrangement of the parts; but it is to be understood that the invention is not confined to the disclosure being susceptible of such changes and modifications which shall define no material departure of the invention as expressed in the appended claims. In the drawings:

Fig. 2 is a longitudinal section taken along line 2—2 of Fig. 1 and shows the top portion of the cylinders illustrating the practical details of my invention.

Fig. 5 is a longitudinal section of one of the rotating manifolds that carry the valves.

Similar numbers of reference denote corresponding parts throughout the several drawings and although in Fig. 1, 2—8 a four cylinder engine is shown it must be understood that this invention is applicable to engines with any number of cylinders.

Figure 4:
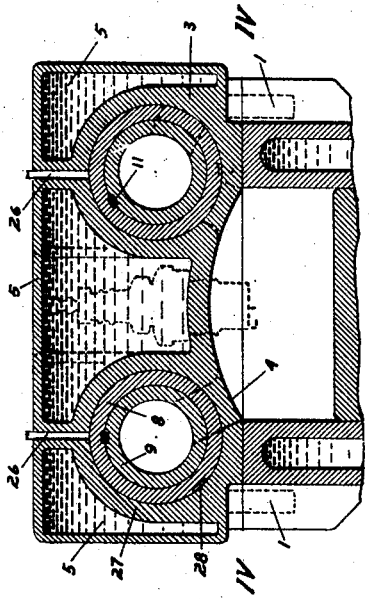
Fig. 4 is a transverse section of Fig. 1 through line 4—4 showing especially the cross section through oiling bores of the valve seats.
Figure 8:
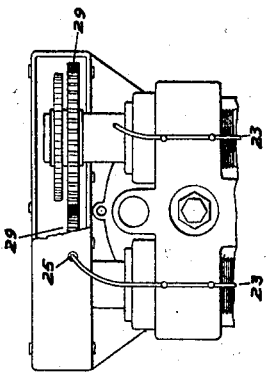
Fig. 8 shows the mechanism employed for driving the rotary hollow shafts or manifolds.
Figure 3:
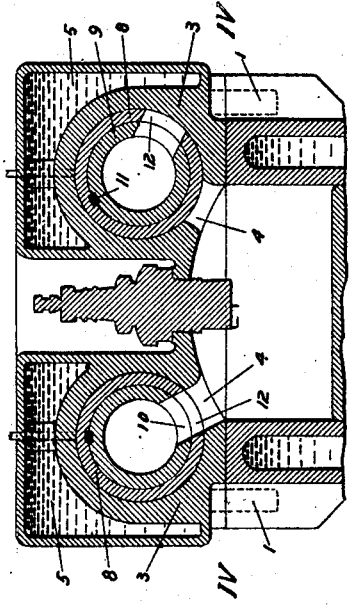
Fig. 3 is a transverse section along line 3—3 of Fig. 1 through the ports of the two valves on one cylinder.

A B, C and D are the cylinders of an internal combustion engine having for their block cover the portion shown above line IV—IV in longitudinal section Fig. 2 and in transverse section Figs. 3 and 4.

Figure 1:
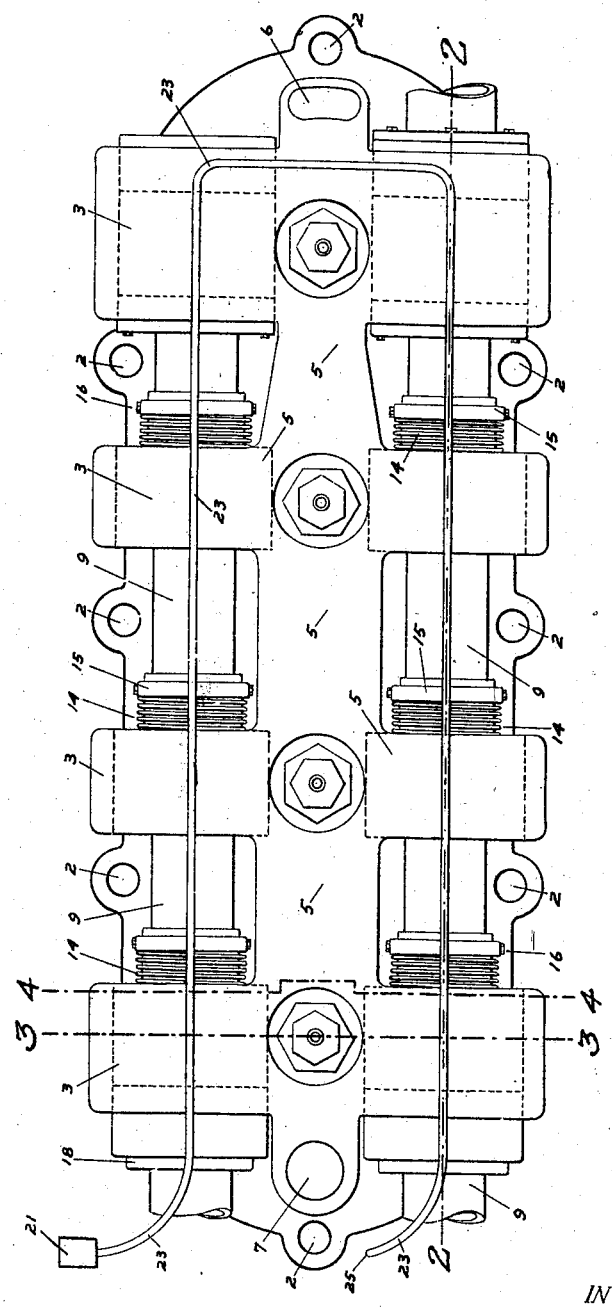
Fig. 1 is a plan view of an internal combustion engine cylinder cover, or block cover, constructed according to my invention.

(1) in Figs. 3 and 4 are the bolts through the holes (2) in the block cover shown in Fig. 1 that hold it in tight adjustment against the cylinders, with the appropriate gasket between the two metal surfaces. Cast integral on the block cover are the valve seats (3) communicating by means of the ports (4) with their respective cylinders and surrounded in their greater portion by a single water jacket (5) which allows the continuous circulation of the cooling water. This water which is the overflow from the cylinder jackets enters the bottom of the block cover jacket, and at (7) issues toward the radiator after cooling block cover and valve seats surfaces.

Figure 6:
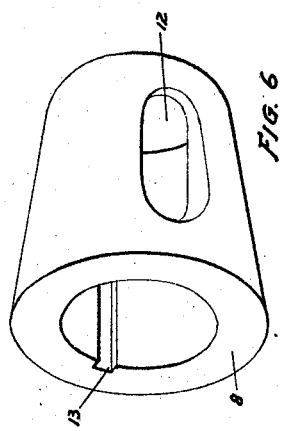
Fig. 6 is a perspective view of a valve constructed so as to do its work when mounted on the rotating manifold shown in Fig. 5.
Figure 7:
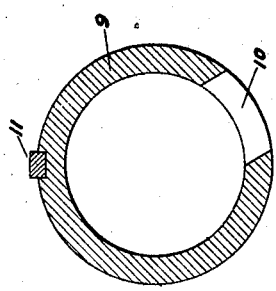
Fig. 7 is a cross section of the rotating manifold in the plane of the line 3—3 showing valve guide and gas port.

The valve seats (3) are made of such section as to fit the valves (8) which are conical truncated on the outside as shown in detail in perspective in Fig. 6 and are cylindrically bored inside to properly fit on the two hollow shafts (9) which are shown detailed in elevation in Fig. 5 and in section in Fig. 7. These two hollow shafts (9) are each closed at one end. The shaft which serves as the intake manifold is in communication with the carburetor by means of a special joint, while the hollow shaft which serves as the exhaust manifold is in communication with the muffler and exhaust pipe by means of another similar special joint. The carburetor and the muffler being located in the last valve seats respectively.

This hollow shaft (9) previously referred to as the rotating manifold, which serves to actuate the rotary movement of the valves and at the same time serves to conduct the gases to or from the cylinders A, B, C . . . etc. is provided with fixed guides (11) corresponding to grooves (13) of valves (8). This allows for the longitudinal expansion of the rotating manifold due to temperature changes without affecting the adjustment of the seating of valves (8) on the valve seats (3); and at the same time this provides for the rotation of the valves jointly with the movement of the rotating manifold.

The rotating manifolds (9) have ports (10) corresponding with ports (12) of the valves, shown in Fig. 6 allowing the flow of gases to and from the cylinders when by the rotation of the shaft (9) the ports (12) of the valves come opposite the ports (4) of the cylinder head block cover. The guides (11) are so located on the hollow shaft (9) and the rotary movement of the hollow shaft (9) is so coordinated with other mechanism of the engine, that the valve ports (12) will be in communication with the cylinder ports (4) at the proper point in the cycle of movement of the piston in the cylinder A, B, C . . . etc. And the dimensions of the ports (10), (12) and (4) shall be such as will allow the flow of the required amount of gases during the time that these ports are in communication with each other.

Each conical valve (8) Fig. 2 is held against its valve seat by a spring (14) coiled around the hollow shaft (9) and held in position between the face of the valve and a collar ring (15) fixed to the hollow shaft (9) by means of set-screws (16). The tension of the springs (14) may be changed by loosening the set screws (16) and changing the position of the collar ring (15) on the hollow shaft (9).

The action of these springs (14) takes up the displacement of the rotating manifold due to temperature changes and also the displacement of the valves due to changes of temperature and the grinding action produced at the surfaces in contact between the valves and their corresponding valve seats. By this means these valves become self-adjusting and self-grinding.

The tension of these springs (14) has a tendency to move the hollow shaft (9) away from the face of the valves. This is avoided by means of pin (17) through the hollow shaft (9), which pin (17) holds washer (18) against an axial ball-bearing (19) placed beyond the valve seat of the first cylinder. At the end opposite to pin (17) and ball-bearing (19), the necessary clearance (30) is provided, to allow for the possible expansion of the hollow shaft (9) due to temperature changes. The entire system of rotating hollow shaft (9) and valves (8) is mounted on axial and radial ball-bearing (19) and (20).

The rotary motion of the entire valve system is obtained by means of driving pinions (29) fixed at the closed ends of the two hollow shafts (9). These two pinions (29) are in mesh each with the other so that the rotary motion of the inlet and exhaust valves will always be properly timed each with the other. On one of the two hollow shafts (9) is fixed a second pinion or sprocket which derives its rotary motion from the crank-shaft or other rotating part of the engine by means of chain or other appropriate bearing which is so connected and arranged that the movement of the valves is properly timed with the movement of the pistons in the cylinders of the engine. All of this driving mechanism operates in an oil bath, being enclosed in a case which receives the oil issuing from the open end (25) of the pipe (23). The overflow of oil from this case returns to the crank-case.

Lubrication of the valves (8) is provided by means of a pump (21) which takes oil from the crank-case through a pipe (22) and pumps it into a lubricating pipe (23) which runs around on top of all the valves feeding the necessary oil. The oil discharged at the free end (25) of pipe (23) lubricates the gears and other mechanism employed to rotate the valve system, and eventually returns to the crank-case.

The oil from the lubricating pipe 23 Fig. 4. flows under pressure through passages (26) into the interior surface of the valve seats.

During operation the flow of gases through both admission and exhaust rotating manifolds is in the same direction always, thus avoiding velocity losses caused by changes or reversals in the direction of motion.

I claim:

1. In an internal combustion engine of one or more cylinders, a detachable cylinder block cover with intake and exhaust valve ports for each cylinder; a system of rotary valves, conical in shape, with ports for the passage of gases, and a corresponding system of fixed conical valve seats incorporating the inlet and outlet ports for each cylinder; these rotary valves mounted in two series, one for inlet and one for exhaust valves, on two hollow cylindrical rotating shafts which serve as intake and exhaust manifolds and in which there are ports corresponding to the ports of the conical valves; these rotary conical valves bored cylindrically throughout their lengths to fit snugly the cylindrical hollow shaft manifold and mounted thereon in such a way as to always rotate jointly with said hollow shaft, but not rigidly attached thereto, the mounting being so arranged by means of guides set in the periphery of the hollow shafts and corresponding grooves in the interior cylindrical surface of the valve so as to provide for longitudinal movement of the conical rotating valve along the rotating hollow shaft manifold and allow adjustment of the conical rotating valve to the fixed conical valve seat.

2. In an internal combustion engine of one or more cylinders with a detachable cylinder block cover incorporating a system of rotary conical valve seats mounted in two series, one for intake valves and one for exhaust valves, of two hollow cylindrical rotating shafts which serve as intake and exhaust manifolds respectively; each shaft having a series of conical valves for said valve seats; the rotary conical valves bored cylindrically throughout their length to a snug fit and so mounted upon the rotating hollow shaft manifolds as to always rotate with the said hollow shaft manifold but so arranged as to provide for longitudinal movement thereon and allow adjustment of the conical rotating valve to the fixed conical valve seat; a collar ring with a set screw for each valve on said hollow shaft, a system of spiral springs for each valve of a size to fit the outside of the cylindrical hollow shafts and so placed, one for each conical valve mounted upon such hollow shaft manifolds, that one end of the spring bears against the end of the valve and the other end of the spring bears against said collar ring which is attached to the hollow shaft by means of said set screws; by means of which springs the pressure between each conical rotating valve and its corresponding fixed conical valve seat may be adjusted readily and independently of the others.

3. In an internal combustion engine of one or more cylinders with a detachable cylinder block cover incorporating a system of rotary conical valve seats with valves mounted upon hollow cylindrical rotating shafts which serve as manifolds; said conical valves cylindrically bored mounted upon said rotating shafts by means of springs and collars with set screws, and caused to rotate therewith by means of splines which allow of longitudinal adjustment of the valves along the hollow shaft, the said cylindrically bored hollow conical valves having groove cut in the interior surface of each valve corresponding to the splines which are so located in the periphery of the hollow shaft or rotating manifold as to permit the valves for all cylinders of the engine to be made from the same pattern, all exactly the same, and therefore readily interchangeable, and also to permit the replacement of any one valve without requiring the replacement of any other part of the valve mechanism.

4. In an internal combustion engine of one or more cylinders with a detachable cylinder block cover incorporating a system of rotating conical valves each of which is in contact with its corresponding fixed conical valve seat in said cover; the rotating conical valves being mounted in two series upon two hollow cylindrical rotating shafts which serve as intake and exhaust manifolds, the conical valves being bored cylindrically to a snug fit with the outer surface of the hollow cylindrical shafts and being mounted thereon in such way as to rotate jointly with said hollow shaft but the mounting is so arranged by means of guides in the periphery of the said hollow shaft that the valves are susceptible of movement along the shaft and capable of adjustment to proper seating with the fixed conical valve seats by means of spiral springs, collars and set-screws on said shaft; a system of axial and radial ball bearings so arranged as to facilitate the free rotation of said hollow cylindrical shafts with valves mounted thereupon and at the same time to allow the longitudinal expansion of the hollow cylindrical rotating shaft or manifold due to changes of temperature without in any way interfering with the free rotating movement thereof nor the proper adjustment of the rotating conical valves with the fixed conical valve seats.

ARMANDO ADOLFO HERNANDEZ MILLET.